June 12, 1956  J. J. DOUDERA, JR., ET AL  2,749,744
DEVICE FOR TESTING PRESSURE IN CONTAINERS
Filed Jan. 29, 1952
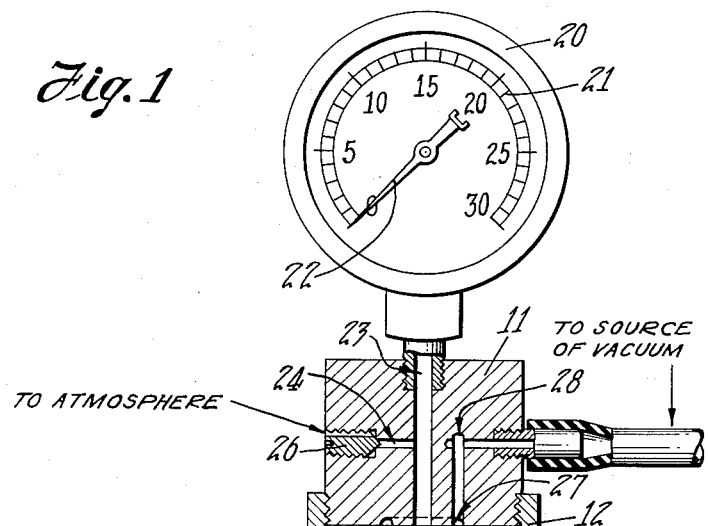
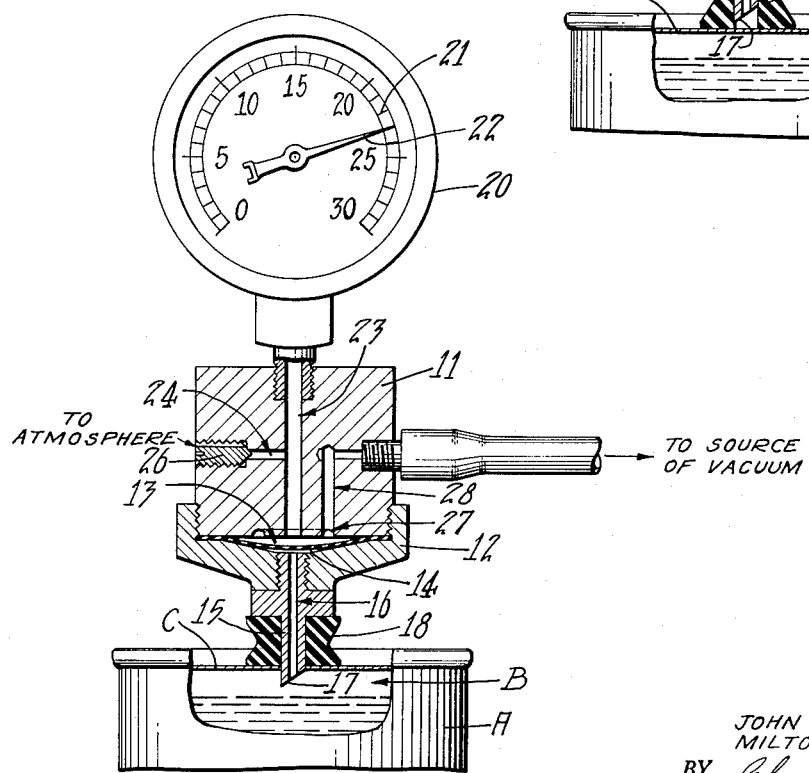
INVENTORS
JOHN J. DOUDERA, JR.
MILTON L. SEAMAN
BY Charles H. Erne
Leland R. McCann
George W. Reiber
ATTORNEYS

United States Patent Office 2,749,744
Patented June 12, 1956

2,749,744

DEVICE FOR TESTING PRESSURE IN CONTAINERS

John J. Doudera, Jr., Union, N. J., and Milton L. Seaman, Glen Ellyn, Ill., assignors to American Can Company, New York, N. Y., a corporation of New Jersey Application January 29, 1952, Serial No. 268,756

8 Claims. (Cl. 73—52)

This invention relates to pressure testing devices and more particularly to devices for determining the internal negative or positive pressure in sealed cans or containers.

In the canning industry it is sometimes desirable to pack products under pressures above or below normal atmospheric pressures and to retain such a pressure in the headspace of a can. In order to determine if the desired pressure is being obtained in the cans, arbitrarily selected cans are occasionally tested during the packing process and during subsequent storage. This testing usually is effected by puncturing the can and applying a pressure gauge thereto. It has been found that readings from such gauges are not always accurate because of large quantities of atmospheric air which are trapped in them and which tend to influence the pressure in the can.

The instant invention contemplates overcoming this difficulty by the provision of a pressure device in which the quantity of trapped air is so small that it does not appreciably affect the accuracy of the device.

It is therefore an object of this invention to provide a testing device for puncturing a container wherein cavities in the testing device which are communicable with the interior of a container to be tested are of very small capacity in proportion to the container headspace so that the effect on the container headspace of air entrapped in the testing device is negligible.

Another object is the provision of such a testing device wherein a registrable pressure may be created in one part of the testing device to balance the pressure within another part of the device communicating with the container interior and thereby determine the amount of pressure in the container.

A still further object is the provision of such a testing device which is compact in structure, ultrasensitive in operation, and easy to apply to a container to be tested.

Numerous other objects and advantages of the invention will be apparent as it is better understood from the following description, which, taken in connection with the accompanying drawinsg, discloses a preferred embodiment thereof.

Referring to the drawings:

Figure 1 is an elevational view of a testing device embodying the instant invention about to be applied to a container, parts of the container and the testing device being broken away and parts shown in section; and Fig. 2 is a view similar to Fig. 1 showing the testing device fully applied to the container and in use for making the test.

As a preferred or exemplary embodiment of the instant invention the drawing discloses a testing device for accurately measuring the degree of vacuum or negative pressure in the headspace B (Figs. 1 and 2) of a sealed container A having a top end member C permanently secured in place and adapted to be punctured to make the test. The testing device comprises a body portion consisting of an upper cylindrical section 11 and a lower cylindrical section 12 threadedly secured together. Between the lower section 12 and the upper section 11 a shallow restricted chamber 13 is created and dimensioned to entrap a minimum of atmospheric air. The restricted chamber 13 contains a thin flexible diaphragm 14 having its peripheral edge hermetically compressed between the body sections 11, 12 and with its upper face engaging the lower face of the upper section 11. In this position, the diaphragm separates the chamber into a lower or testing side and an upper or pressure indicating side.

Secured to the lower section 12 is a depending tubular stem 15 having a narrow or restricted channel 16 communicating with the chamber 13 and the lower face or testing side of the diaphragm 14. The channel 16 opens into the atmosphere through a sharp piercing point 17 formed on the lower end of the stem 15 for puncturing the container end member C when the device is applied to the container to be tested. The stem 15 is surrounded by a compressible collar 18 of flexible sealing material, for example rubber, which normally extends beyond the lower extremity of the piercing point 17. The collar 18 yields a sufficient amount to provide a cushion seal against the container end member C around the stem 15 when the end member is punctured as shown in Fig. 2 and thereby prevents entrance of outside atmospheric air into the interior of the container during the testing operation.

The upper section 11 of the testing device is provided with a vacuum gauge 20 threadedly secured thereto. For the purpose of this invention this vacuum gauge may be of any suitable construction commonly in use, preferably one having a dial 21 and an indicating hand 22 substantially as shown. The gauge 20 communicates with a passageway 23 which extends through the upper section 11 of the testing device for its full length and terminates in an opening in the chamber in communication with the upper face or gauge side of the diaphragm 14. The passageway 23 is also in communication with the outside atmosphere through a port 24 having a screw type adjustable bleed valve 26 threadedly secured therein. The bleed valve is adjusted to permit a small predetermined continuous flow of atmospheric air into the passageway 23. The bottom or lower face of the upper section 11 of the device is formed with a groove 27 surrounding the lower open end of the passageway 23. The groove communicates through an opening in the chamber wall and a bore 28 to a suitable source of high vacuum which is adapted to vacuumize the passageway 23 as will be hereinafter explained.

When the testing device is initially applied to a container to be tested as shown in Fig. 1 it is pressed down against the container end member C to puncture it as shown in Fig. 2. This places the channel 16 in communication with the headspace B of the container. The vacuum in the container draws the diaphragm 14 down into the chamber 13, away from the lower face of the upper section 11 and uncovers the lower end of the passageway 23 as shown in Fig. 2. The uncovering of the passageway 23 places the high vacuum source, through its bore 28, in communication with the passageway through the portion of the chamber 13 adjacent the upper face of the diaphragm. This permits a vacuum to be drawn on the passageway 23 until it balances or slightly exceeds the vacuum in the container. This vacuum is shown by the indicator needle 22 on the vacuum gauge 20. The balancing pressure in the passageway 23 causes the diaphragm 14 to move upward against the upper section 11 and thereby closes the passageway 23 and cuts off the high vacuum source from the passageway.

With the diaphragm in this up or normal position, and the high vacuum source sealed off from the passageway 23 a drop in vacuum, i. e. an increase in pressure in the passageway 23 takes place due to the entrance of air through the bleed valve 26. This build-up of pressure in the passageway 23 above the diaphragm forces the diaphragm down again into a flexed position as mentioned above and again permits a vacuum to be drawn on the passageway. This vacuum in the passageway again pulls the diaphragm up to close off the vacuum source from the passageway causing the vacuum therein to drop and the pressure of the bleed-in air to build-up as before in a repeat cycle.

In operation the repetition of the cycle of operation results in a very rapid vibration of the diaphragm. The rise and fall of the vacuum in the passageway 23 is inappreciable and takes place so rapidly that the indicating needle 22 on the vacuum gauge 20 remains substantially stationary at the vacuum created in the passageway 23 to balance the vacuum in the headspace B of the punctured container. Thus the vacuum indicated on the gauge 20 is the same as the original vacuum in the container before puncturing, and through this device the original vacuum in the container may be readily and accurately determined.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. An apparatus for testing the pressure in sealed containers, comprising in combination a body having a chamber formed therein, a vacuum gauge on said body, said body having a passageway therein establishing communication between said gauge and said chamber, a continuous air supplying means in said body and communicating with said passageway, a flexible diaphragm in said chamber and having a gauge side and a testing side, the gauge side of said diaphragm normally closing the opening of said passageway into said chamber, a hollow piercing element on said body for puncturing a container to be tested, the hollow interior of said piercing element establishing communication between the interior of the punctured container and the testing side of said diaphragm in said chamber for establishing the same pressure on said testing side of the diaphragm as in the container, vacuum means communicating with a bore in said body adjacent said passageway and communicating with the gauge side of said diaphragm, whereby when the vacuum in said container withdraws said diaphragm from its normally closed position at the opening to said passageway, communication is established between said vacuum means and gauge through said bore and passageway on the gauge side of said diaphragm and said continuous air supplying means reduces the vacuum in said passageway thus causing the diaphragm to vibrate between its said normally closed position and its withdrawn or open position to produce on said gauge a substantially constant reading indicating the degree of vacuum in said container.

2. An apparatus for testing pressure in sealed containers, comprising in combination a body having a chamber formed therein, a flexible diaphragm in said chamber and dividing the chamber into a testing side and a pressure indicating side, a hollow piercing element on said body for perforating a container to be tested, the interior of said piercing element communicating with said testing side of the chamber for establishing therein the pressure condition within said perforated container the space in said hollow piercing element and in said chamber on the testing side of said diaphragm being restricted to a minimum so that the accuracy of the apparatus is not appreciably affected by air trapped in said space, pressure means including sources of two different pressures communicating with said chamber through openings in said pressure indicating side of the chamber for balancing the pressure on said testing side of the diaphragm, pressure indicating means on said body and communicating through an opening in said chamber with said pressure indicating side of the diaphragm for indicating said balanced pressure, said flexible diaphragm normally closing said chamber openings on its pressure indicating side for stopping communication between at least one of said pressure sources and said pressure indicating means, and said diaphragm being flexed from said closed position to open position establishing communication between both of said pressure sources and said indicating means when the pressure at a said opening sufficiently exceeds the pressure in the container being tested, whereby said diaphragm is vibrated between said closed and open positions and a substantially constant pressure balanced with that in the container is shown on said pressure indicating means.

3. The combination according to claim 2 wherein one of said sources of pressure is atmospheric and communicates with said pressure indicating side of the chamber through the same opening by which the pressure indicating means communicates with the chamber.

4. An apparatus for testing pressure in sealed containers, comprising in combination a body having a chamber formed therein, a flexible diaphragm in said chamber and dividing the chamber into a testing side and a pressure indicating side, said chamber on its pressure indicating side having a substantially flat wall normally engaged by the pressure indicating side of said diaphragm, a hollow piercing element on said body for perforating a container to be tested, the interior of said piercing element communicating with said testing side of the chamber for establishing therein the pressure condition within said perforated container the space in said hollow piercing element and in said chamber on the testing side of said diaphragm being restricted to a minimum so that the accuracy of the apparatus is not appreciably affected by air trapped in said space, pressure means including sources of two different pressures communicating with said chamber through openings in said flat wall on the pressure indicating side of the chamber for balancing the pressure on said testing side of the diaphragm, pressure indicating means on said body and communicating through an opening in said chamber with said pressure indicating side of the diaphragm for indicating said balanced pressure, said flexible diaphragm normally closing said chamber openings on its pressure indicating side for stopping communication between at least one of said pressure sources and said pressure indicating means, and said diaphragm being flexed from said closed position to open position establishing communication between both of said pressure sources and said indicating means when the pressure at a said opening sufficiently exceeds the pressure in the container being tested, whereby said diaphragm is vibrated between said closed and open positions and a substantially constant pressure balanced with that in the container is shown on said pressure indicating means.

5. An apparatus for testing pressure in vacuum sealed containers, comprising in combination a body having a chamber formed therein, a flexible diaphragm in said chamber and dividing the chamber into a testing side and a vacuum indicating side, a hollow piercing element on said body for perforating a container to be tested, the interior of said piercing element communicating with said testing side of the chamber for establishing therein the pressure condition within said perforated container the space in said hollow piercing element and in said chamber on the testing side of said diaphragm being restricted to a minimum so that the accuracy of the apparatus is not appreciably affected by air trapped in said space, vacuum means in said body and communicating through a vacuum opening in said vacuum indicating side of the chamber for balancing the vacuum on said testing side of the diaphragm, a constantly open air bleeding means in said body communicating through an opening in said chamber with the vacuum indicating side of said diaphragm, vacuum indicating means on said body and communicating through an opening in said chamber with the vacuum indicating side of said diaphragm for indicating the vacuum balanced with the vacuum in said container, said flexible diaphragm normally closing said chamber openings on its vacuum indicating side for stopping communication between said vacuum means and said vacuum indicating and air bleeding means, and said diaphragm being flexed from said closed position to open position establishing communication between said vacuum means and said air bleeding and vacuum indicating means when the vacuum at said air bleeding opening sufficiently exceeds the pressure in the container being tested, whereby said diaphragm is vibrated between said closed and open positions and substantially constant vacuum balanced with that in the container is shown on said vacuum indicating means.

6. The combination according to claim 5 wherein said air bleeding means and said vacuum indicating means communicate through a single opening in said chamber with the vacuum indicating side of said diaphragm.

7. An apparatus for testing pressure in vacuum sealed containers, comprising in combination a body having a chamber formed therein, a flexible diaphragm in said chamber and dividing the chamber into a testing side and a vacuum indicating side, said chamber on its vacuum indicating side having a substantially flat wall normally engaged by the vacuum indicating side of said diaphragm, a hollow piercing element on said body for perforating a container to be tested, the interior of said piercing element communicating with said testing side of the chamber for establishing therein the pressure condition within said perforated container the space in said hollow piercing element and in said chamber on the testing side of said diaphragm being restricted to a minimum so that the accuracy of the apparatus is not appreciably affected by air trapped in said space, vacuum means in said body and communicating through a vacuum opening in said vacuum indicating side of the chamber for balancing the vacuum on said testing side of the diaphragm, vacuum indicating means on said body and communicating through a passageway in said body and an opening in said flat wall of the chamber with the vacuum indicating side of said diaphragm for indicating the vacuum balanced with the vacuum in said container, a constantly open air bleeding means in said body communicating with said passageway and the vacuum indicating side of said diaphragm, said flexible diaphragm normally closing said chamber openings in said flat walls of the chamber on its vacuum indicating side for stopping communication between said vacuum means and said vacuum indicating and air bleeding means, and said diaphragm being flexed from said closed position to open position establishing communication between said vacuum means and said air bleeding and vacuum indicating means when the vacuum at said air bleeding opening sufficiently exceeds the pressure in the container being tested, whereby said diaphragm is vibrated between said closed and open positions and substantially constant vacuum balanced with that in the container is shown on said vacuum indicating means.

8. The combination according to claim 7 wherein said flat wall of the chamber is formed with a groove spaced from and substantially surrounding said opening communicating with the vacuum indicating means, and said chamber opening to said vacuum means also communicating with said groove whereby communication between said openings is facilitated during said vibratory movements of the diaphragm.

References Cited in the file of this patent

UNITED STATES PATENTS

| | | |
|---|---|---|
| 1,344,515 | Phelps | June 22, 1920 |
| 2,216,374 | Martin | Oct. 1, 1940 |
| 2,393,552 | Morpeth | Jan. 22, 1946 |
| 2,486,052 | Moore | Oct. 25, 1949 |
| 2,512,134 | Baule | June 20, 1950 |
| 2,542,905 | Cromer et al. | Feb. 20, 1951 |
| 2,642,739 | Diez | June 23, 1953 |
| 2,695,515 | Ward et al. | Nov. 30, 1954 |

OTHER REFERENCES

The Phlebomanometer, etc. Burch et al., Journal American Medical Assoc., vol. 123, No. 2, Sept. 11, 1943, pps. 91, 92.